(12) United States Patent
Wu

(10) Patent No.: US 12,415,141 B2
(45) Date of Patent: Sep. 16, 2025

(54) JOYSTICK FASTENING DEVICE

(71) Applicant: Jinhong Wu, Shenzhen (CN)

(72) Inventor: Jinhong Wu, Shenzhen (CN)

( * ) Notice: Subject to any disclaimer, the term of this patent is extended or adjusted under 35 U.S.C. 154(b) by 0 days.

(21) Appl. No.: 18/660,292

(22) Filed: May 10, 2024

(65) Prior Publication Data

US 2025/0073603 A1 Mar. 6, 2025

(30) Foreign Application Priority Data

Sep. 4, 2023 (CN) .......................... 202322405737.9

(51) Int. Cl.
*A63F 13/98* (2014.01)
*A63F 13/245* (2014.01)

(52) U.S. Cl.
CPC ............ *A63F 13/98* (2014.09); *A63F 13/245* (2014.09); *A63F 2300/8082* (2013.01)

(58) Field of Classification Search
CPC ..................... A63F 13/98; A63F 13/245; A63F 2300/1043; A63F 2300/1062; A63F 2300/8082
See application file for complete search history.

(56) References Cited

U.S. PATENT DOCUMENTS

| | | | | |
|---|---|---|---|---|
| 4,630,823 A | * | 12/1986 | Grant | A63F 13/24 273/148 B |
| 4,909,514 A | * | 3/1990 | Tano | A63F 13/803 273/148 B |
| 5,046,739 A | * | 9/1991 | Reichow | A63F 13/02 273/148 B |
| 5,207,791 A | * | 5/1993 | Scherbarth | F16M 11/00 224/678 |
| 5,419,613 A | * | 5/1995 | Wedeking | A63F 13/24 248/205.2 |
| 5,801,918 A | * | 9/1998 | Ahearn | G06F 15/0216 361/679.55 |
| 6,688,571 B1 | * | 2/2004 | Pauls | A61G 5/10 248/282.1 |

(Continued)

FOREIGN PATENT DOCUMENTS

| | | | | |
|---|---|---|---|---|
| CN | 201133614 Y | * | 10/2008 | ............ A63F 13/02 |
| CN | 218106714 U | * | 12/2022 | |

(Continued)

OTHER PUBLICATIONS

"Characteristics of Thermosets Part 20: Tensile Testing Part One," by Jeffrey Gotro, published Oct. 2, 2017, Polymer Innovation Blog. (Year: 2017).*

(Continued)

*Primary Examiner* — Steven J Hylinski

(57) ABSTRACT

The present invention discloses a joystick fastening device and a joystick application assembly, comprising the components: an reception cavity whose one end has a joystick receiving opening; a connection, of which one end opposite to the reception cavity shell has a first connecting portion; and an extension having a second connecting portion and connected with the first connecting portion via the second connecting portion to realize the special movement of the joystick via the extension. The present invention can prevent the joystick from releasing, significantly reduce shake-off of the joystick, and provide better gaming experience.

15 Claims, 5 Drawing Sheets

(56) References Cited

U.S. PATENT DOCUMENTS

| | | | | |
|---|---|---|---|---|
| D568,882 S | * | 5/2008 | Ashida | D21/333 |
| D583,875 S | * | 12/2008 | Roberts | D21/324 |
| D590,893 S | * | 4/2009 | Roberts | D21/324 |
| D599,352 S | * | 9/2009 | Takamoto | D21/333 |
| D631,098 S | * | 1/2011 | Ashida | D21/333 |
| 8,057,309 B1 | * | 11/2011 | Mead | A63F 13/837 463/47 |
| D654,118 S | * | 2/2012 | Sogabe | D14/218 |
| 8,298,090 B2 | * | 10/2012 | Kazama | A63F 13/837 463/47 |
| 8,419,541 B2 | * | 4/2013 | Mao | A63F 13/285 463/37 |
| 8,568,233 B2 | * | 10/2013 | Block | A63F 13/98 463/47 |
| 8,870,653 B2 | * | 10/2014 | Yamashita | A63F 13/213 463/36 |
| 8,894,490 B2 | * | 11/2014 | Brandt | A63F 13/98 463/3 |
| D769,373 S | * | 10/2016 | Sogabe | D14/218 |
| 10,471,344 B2 | * | 11/2019 | Nokuo | A63F 13/245 |
| 10,857,471 B2 | * | 12/2020 | Hirose | A63F 13/98 |
| D931,374 S | * | 9/2021 | Meng | D21/333 |
| 11,426,651 B1 | * | 8/2022 | Jensen | A63F 13/245 |
| 11,577,173 B2 | * | 2/2023 | Armand | A63F 13/98 |
| D988,409 S | * | 6/2023 | Chen | D21/333 |
| D997,249 S | * | 8/2023 | Wu | D21/333 |
| 2004/0180719 A1 | * | 9/2004 | Feldman | A63B 24/00 463/36 |
| 2008/0015017 A1 | * | 1/2008 | Ashida | A63F 13/803 463/37 |
| 2009/0082108 A1 | * | 3/2009 | Ye | A63F 13/20 463/39 |
| 2009/0149255 A1 | * | 6/2009 | Fu | A63F 13/98 463/36 |
| 2010/0255913 A1 | * | 10/2010 | Kidakarn | A63F 13/98 463/37 |
| 2011/0034250 A1 | * | 2/2011 | Brandt | A63F 13/245 463/37 |
| 2011/0081968 A1 | * | 4/2011 | Mar | A63F 13/245 463/37 |
| 2011/0190056 A1 | * | 8/2011 | Xu | G06F 3/02 345/169 |
| 2011/0244962 A1 | * | 10/2011 | Kidakarn | A63F 13/245 463/36 |
| 2011/0306424 A1 | * | 12/2011 | Kazama | A63F 13/98 463/37 |
| 2012/0122576 A1 | * | 5/2012 | Mao | A63F 13/245 463/32 |
| 2013/0196769 A1 | * | 8/2013 | Shocklee | A63B 15/00 463/37 |
| 2021/0077912 A1 | * | 3/2021 | Armand | A63F 13/98 |
| 2023/0294004 A1 | * | 9/2023 | O'Dowd | A63F 13/98 463/47 |

FOREIGN PATENT DOCUMENTS

| | | | | |
|---|---|---|---|---|
| JP | 2010279817 A | * | 12/2010 | |
| JP | 2014060419 A | * | 4/2014 | A63F 13/02 |
| WO | WO-2007016660 A2 | * | 2/2007 | A63F 13/06 |
| WO | WO-2007095082 A2 | * | 8/2007 | A63F 11/00 |

OTHER PUBLICATIONS

"ZyberVR Quest 2 Gorilla Tag Long Arms Fitness Dual Sticks," published Apr. 5, 2023. Source: https://zybervr.com/products/zybervr-dual-handles-extension-grips-for-oculus-quest-2? (Year: 2023).*

"Hands On Review Yoges Handle Attachments for Quest 2 Controllers," by Jon Jaehnig. Published Aug. 10, 2023. Source: https://arpost.co/2023/08/10/review-yoges-adapters-quest-2-controllers/ (Year: 2023).*

* cited by examiner

JOYSTICK FASTENING DEVICE

CROSS-REFERENCE TO RELATED APPLICATIONS

This application claims priority to Chinese Patent Application No. 202322405737.9, filed on Sep. 4, 2023, which is hereby incorporated by reference in its entirety.

TECHNICAL FIELD

The present invention relates to the technical field of joysticks, in particular to a joystick fastening device.

BACKGROUND

Joystick or joystick assembly is a common interactive device for games or virtual reality (VR). By gripping the joystick, a user can make a corresponding action and manipulate a game or simulate a realistic action in a virtual scenario for better gaming experience. Although the authentic joystick can satisfy the user's gaming operation in the basic functions, but some special gaming scenarios, for example, saber, golf, table tennis, shooting and fishing, have certain requirements for the size and grip sense of the joystick, while the authentic joystick is too small to enable the user to achieve good experience and a greater level of immersion in conceivable ways.

In order to further enhance the realistic experience of the game, some joysticks will be equipped with external extensions, some of which are directly equipped with a lengthened shell on the lower part of the joystick and the shell will be connected to the original shell by using a rope passing through the cable of the joystick. Nevertheless, such structure is not reliable, and sometimes the joystick and the lengthened shell are disconnected during gaming, thereby causing accidental release of the joystick and hitting against on people or other objects, and resulting in bad effects and poor gaming experience.

SUMMARY

The technical solution of the present invention is to provide a joystick fastening device, which can solve the technical problems in the prior art that the authentic joystick is too small to enable the user to achieve good experience and a greater level of immersion in conceivable ways, and the joystick and the lengthened shell are disconnected during gaming, thereby causing accidental release of the joystick and hitting against on people or other objects, and resulting in bad effects and poor gaming experience. At any rate, the joystick is not released during gaming, significantly reducing shake-off of the joystick, avoiding risks and providing a better gaming experience.

A technical solution of the present invention for solving the above technical problems is:

A joystick fastening device, comprising the components:
An reception cavity whose one end has an opening for receiving a joystick; the other end of the reception cavity away from the opening in the longitudinal direction of the opening is a cavity bottom whose size is less than or equal to that of the opening; the reception cavity further comprises a hole, and the hole is arranged at a position outside the opening;
A connection, which extends from a reception cavity shell at a preset angle to a central axis of the reception cavity, and one end of the connection opposite to the reception cavity shell has a first connecting portion;
An extension, which has a second connecting portion matched with the first connecting portion of the connection, and is connected to the first connecting portion via the second connecting portion so as to realize spatial movement of the joystick via the extension; and
A fastener for fastening the joystick.

Preferably, the preset angle ranges from 0° (included) to 180° (included); the fastener comprises at least one of a strap, a buckle, a screw, or a nut; the fastener is designed to lock the joystick to limit movement of the joystick in the reception cavity.

Preferably, the strap has a first end and a second end arranged outside the first end, wherein the first end of the strap is fixedly connected to the joystick, and the second end passes through the hole or is fixed on the connection or the reception cavity shell; the strap may be tightened to provide the joystick with a pulling force along the bottom of the reception cavity as the second end passes through the hole.

Preferably, the buckle has a raised member which snaps into the hole to provide the joystick with a pushing force along the cavity bottom so as to limit the longitudinal movement of the joystick along the reception cavity.

Preferably, the buckle is mounted on the joystick at a distance from the opening in the longitudinal direction of the reception cavity, and the raised member of the buckle snaps into the hole to provide the joystick with a pushing force along the cavity bottom so as to limit the longitudinal movement of the joystick along the reception cavity.

Preferably, the buckle has a rotary shaft, the rotary shaft is mounted on the reception cavity shell, and the buckle can rotate along the direction of rotation of the rotary shaft.

Preferably, a screw passes through the hole, and by means of rotating the screw, the reception volume of the reception cavity may be changed to limit the movement of the joystick in the reception cavity.

Preferably, a nut is mounted on the reception cavity shell, and by means of rotating the nut, the reception volume of the reception cavity may be changed to limit the movement of the joystick in the reception cavity.

Preferably, the joystick further comprises an elastic material, and the joystick is fixed at an inner wall of the reception cavity by the elastic material, and the friction between the joystick and the inner wall of the reception cavity is increased by the elastic material.

Preferably, the connection further comprises a rotary member arranged between the first connecting portion and the reception cavity wall for fastening or tightening the strap.

Preferably, the first connecting portion of the connection comprises at least one of a fixing hole, a threading, a slot, and a raised member, and the connection is designed to fixedly connect the extension; the second connecting portion of the extension comprises at least one of a fixing hole, a threading, a slot, and a raised member to fixedly connect the connection.

Preferably, the rotary member comprises a rotary shell and a rotary fixed shaft, wherein the rotary shell has a strap fixing part for fixing the strap, the inner wall of the rotary shell has a concave structure, the rotary fixed shaft has a convex structure corresponding to the concave structure of the rotary shell, the concave structure and the convex structure can be clamped and rotated to tighten the strap.

Preferably, one end of the extension has a grip at the second connecting portion away from the reception cavity.
}

Preferably, the grip has a male-female anti-slip structure made of resilient material.

Preferably, the extension further comprises a telescopic structure for adjusting the length of the extension.

Preferably, the telescopic structure comprises:

An outer extension, which is designed for limiting the shortest length of the extension and provided with a grip; the outer extension has a through-hole structure, the first end of the outer extension has a threading structure, the size of the through-hole corresponding to the outlet of the first end of the outer extension is smaller than outer diameter of the first end of the inner extension, and the size of the through-hole of the outer extension is larger than the outer diameter of the first end of the inner extension, except for the outlet of the first end of the outer extension;

A locking elastic member for locking the movement of the inner extension, comprising at least one of a slotted deformation structural member and an elastic material;

A locking rotary member, which is designed for adjusting the deformation of the locking elastic member, and provided with a through-hole structure and with an internal threading, and the size of a first end opening of the locking rotary member is greater than a second end opening corresponding to the first end opening of the locking rotary member;

The inner extension is sleeved inside the outer extension, a first end portion of the non-inner extension of the inner extension can pass through a first end outlet of the outer extension, a locking elastic member is mounted on the through-hole of the locking rotary member, the locking elastic member and locking rotary member pass through the inner extension which extends out of the first end outlet portion of the outer extension, and are rotatably connected to a threading structure of the outer extension, when the locking member is locked, the locking elastic member deforms to lock the movement of the inner extension, and when the locking member is released, the locking elastic member deforms slightly to release the inner extension, and the inner extension can move telescopically. Preferably, the reception cavity is transparent.

More preferably, the material of the reception cavity is PC.

One or more technical solutions provided in the present application have at least the following technical effects or advantages:

The technical solution above provides a reception cavity for receiving the joystick, a connection extending from the reception cavity and an extension connected to the connection, and can satisfy users' experience demand in different game scenarios. The joystick with a lengthened extension can satisfy users' experience demands in recreational games such as golf, fencing or billiards, and the joystick with a short extension can satisfy users' experience demands in such games as table tennis and saber for better experience feel.

With the adoption of one or more fasteners of a strap, a buckle, a screw and a nut, the movement of the joystick may be limited in combination with the hole of the reception cavity, i.e. the strap provides a pulling force, the buckle limits or provides a pushing force, and the screw and nut limit the volume of the reception cavity in combination with the elastic material, thereby preventing the joystick from releasing from the reception cavity during use, or shake-off, avoiding any risks and providing a better game experience.

Figure 1:
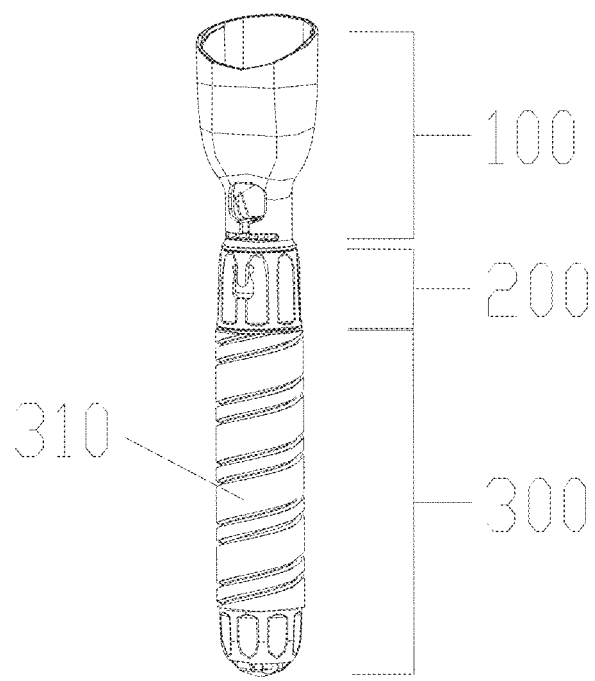
FIG. 1 is a schematic diagram of the stereostructure of the present invention.

In the figures, 100 means reception cavity, 1001 opening, 1003 cavity bottom, 1005 hole, 1007 shell, 200 connection, 2001 first connecting portion, 2003 second connecting portion, 2011 concave structure, 2013 raised structure, 250 rotary member, 251 rotary fixed shaft, 2511 first rotary fixed shaft, 2513 second rotary fixed shaft, 2515 first limiting post, 2517 second limiting post, 300 extension, 310 grip, 400, joystick application assembly, 500 fastener, 501 buckle, 5011 raised member, 503 nut and 505 screw.

DESCRIPTION OF EMBODIMENTS

The following describes the prevent invention in detail with reference to embodiments and the figures. It is noted that the following embodiments are only used to explain the prevent invention, and do not constitute a limitation on the prevent invention. Moreover, the technical features related to the embodiments of the present invention described as follows can combine with each other when they are not conflict with each other.

The technical solutions of the embodiments of the present application solve the problems in the prior art in some special game scenarios, such as saber, golf, table tennis, shooting and fishing by providing a joystick fastening device, which comprises a joystick application assembly 400 connected to the joystick fastening device. For the problems that the authentic joystick is too small to enable the user achieve good experience and a greater level of immersion in conceivable ways, and the joystick (or joystick application assembly 400) and the extension 300 are disconnected during gaming, thereby causing accidental release of the joystick and hitting against on people or other objects, bad effects and poor gaming experience, a connection 200 is connected in the reception cavity 100, an extension 300 is connected with the connection 200, and the joystick (or joystick application assembly) is fastened with a fastener 500 to prevent the joystick releasing during use, significantly reducing shake-off of the joystick, avoiding risks and providing a better gaming experience.

Figure 2:
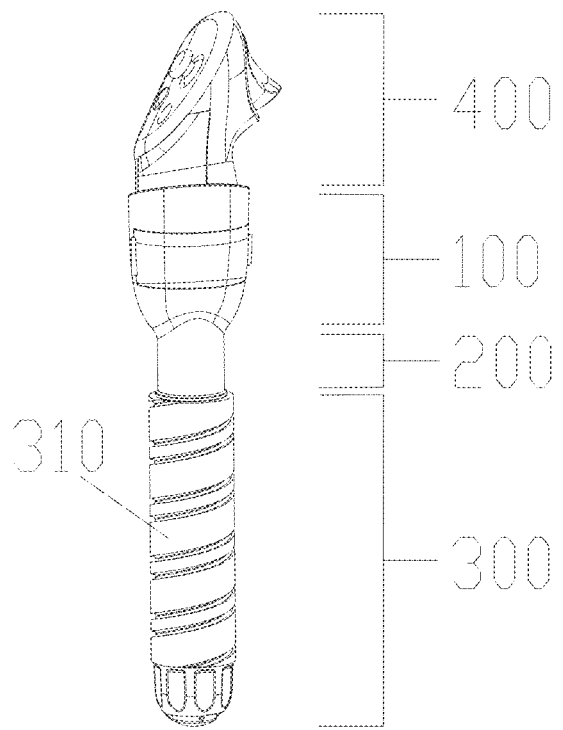
FIG. 2 is a schematic diagram of the joystick application assembly when connected to the joystick fastening device of the present invention.

The general idea of the embodiments of the present invention for solving the above technical problems is as follows:

Providing a joystick fastening device, which comprises a joystick application assembly 400 connected to the joystick fastening device, as shown in FIGS. 1 and 2, wherein the joystick fastening device comprises a reception cavity 100, a connection 200, an extension 300 and a fastener 500; the reception cavity 100 is connected to the connection 200, the connection is connected to the extension 300, and fixes the joystick (or the joystick application assembly 400) via the fastener 500. Thus, the extension 300 with proper length can enhance the gaming experience with the joystick (VR joystick) or joystick application assembly 400 (VR joystick application assembly 400). Meanwhile, the joystick or the joystick application assembly 400 may be prevented from releasing during use via the fastener 500, significantly reducing shake-off of the joystick or joystick application assembly 400, avoiding risks and providing a better gaming experience. The lengthened extension 300 can satisfy consumers' good experience feel demands for such games as golf, fencing or billiards.

To make the technical solutions above clear, the following further describes the prevent invention in detail with reference to the drawings of the specification and embodiments.

Figure 3:
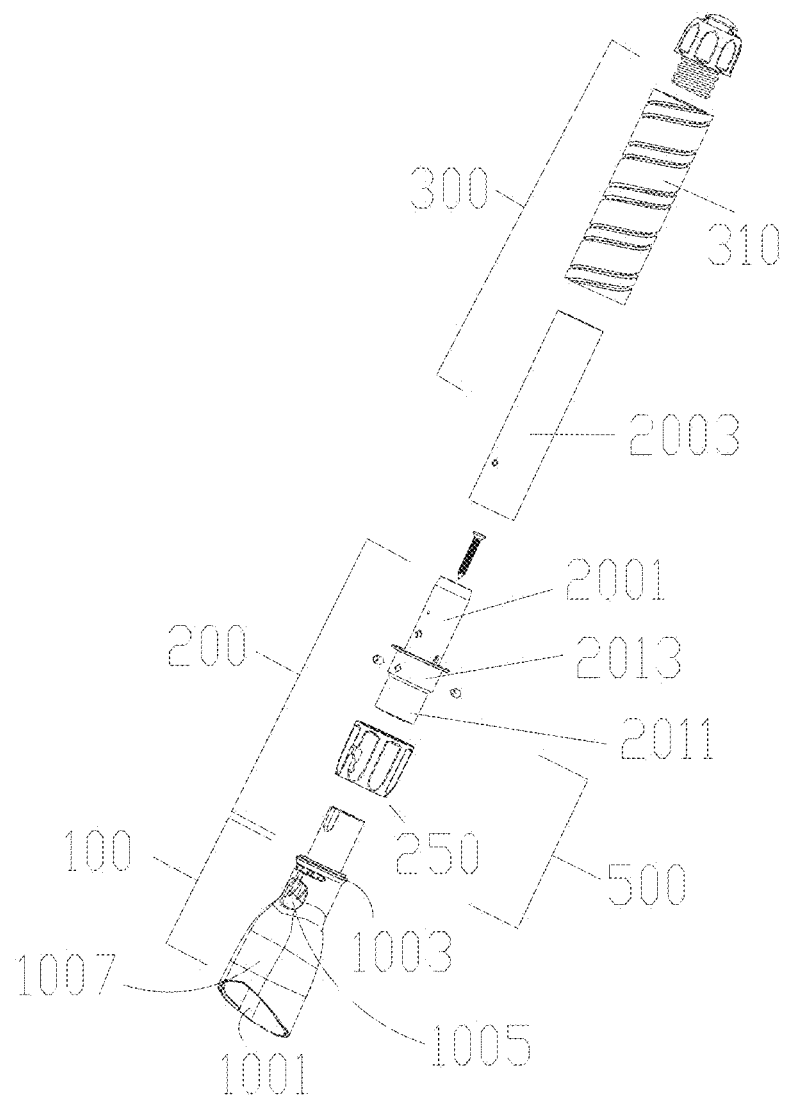
FIG. 3 is a schematic diagram of the present invention in a separated state.

A joystick fastening device, as shown in FIG. 3, comprising the components:

An reception cavity 100 whose one end has an opening 1001 for receiving a joystick or joystick application assembly 400; the other end of the reception cavity 100 away from the opening 1001 in the longitudinal direction of the opening 1001 is a cavity bottom 1003, and the size of the cavity bottom 1003 is less than or equal to the size of the opening 1001; the reception cavity 100 further comprises a hole 1005, and the hole 1005 is arranged at a position outside the opening 1001;

A connection 200, which extends from the shell 1007 of the reception cavity 100 at a preset angle to the central axis of the reception cavity 100, and one end of the connection 200 opposite to the reception cavity 100 shell 1007 has a first connecting portion 2001;

An extension 300, which has a second connecting portion 2003 matched with the first connecting portion 2001 of the connection 200, and is connected to the first connecting portion 2001 via the second connecting portion 2003 so as to realize spatial movement of the joystick via the extension 300.

The embodiments of the present invention also provide a joystick application assembly 400 that can be connected to the joystick fastening device of any of the above.

Specifically, the joystick application assembly 400 comprises a VR hand-held application assembly, wherein application game scenarios of the VR hand-held application assembly comprise saber, golf, table tennis, shooting and fishing.

Specifically, the preset angle ranges from 0° (included) to 180° (included); the joystick application assembly also comprises a fastener 500 designed for fixing the joystick and comprising at least one of a strap, a buckle 501, a screw 505, or a nut 503; the fastener is designed to lock the joystick to limit movement of the joystick in the reception cavity 100.

Specifically, the strap has a first end and a second end (not shown in the figure) arranged outside the first end, wherein the first end of the strap is fixedly connected to the joystick, and the second end passes through the hole 1005 or is fixed on the connection 200 or the reception cavity 100 shell 1007; the strap may be tightened to provide the joystick with a pulling force along the reception cavity 100 bottom as the second end passes through the hole 1005.

Specifically, the joystick further comprises an elastic material, and the joystick is fixed at an inner wall of the reception cavity 100 by the elastic material, and the friction between the joystick and the inner wall of the reception cavity 100 is increased by the elastic material.

Specifically, the connection 200 further comprises a rotary member 250 arranged between the first connecting portion 2001 and the reception cavity 100 wall for fastening or tightening the strap.

Specifically, the first connecting portion 2001 of the connection 200 comprises at least one of a fixing hole, a threading, a slot, and a raised member 5011, and the connection 200 is designed to fixedly connect the extension 300; the second connecting portion 2003 of the extension 300 comprises at least one of a fixing hole, a threading, a slot, and a raised member 5011 to fixedly connect the connection 200.

Specifically, the rotary member 250 comprises a rotary shell 1007 and a rotary fixed shaft 251, wherein the rotary shell 1007 has a strap fixing part for fixing the strap, the inner wall of the rotary shell 1007 has a concave structure 2011, the rotary fixed shaft 251 has a convex structure 2013 corresponding to the concave structure 2011 of the rotary shell 1007, the concave structure 2011 and the convex structure 2013 can be clamped and rotated to tighten the strap. The concave structure 2011 can be a plurality of continuous grooves, the clamping device (one of the connection 200) has a positioning assembly which is engaged with the grooves and has elasticity, and one end of the positioning assembly is placed in the grooves and is rotatably clamped with the rotary shell 1007;

The user rotates the rotary shell 1007, and when the rotational force exceeds the elastic force of the positioning assembly, the positioning assembly rotates from the groove engaged with the original groove to another groove for engagement, and the rotary shell 1007 is limited and fixed in the circumferential direction by the positioning assembly and the groove, and when the rotary shell 1007 rotates, the strap of the joystick is driven to rotate and tighten and wind around the mounting assembly; because the rotary shell 1007 is limited and fixed, the strap of the joystick is reliably fixed inside the reception cavity 100, the joystick is stably mounted and fixed inside the reception cavity 100, preventing them from releasing during use so as to make users have better gaming experience.

Figure 7:
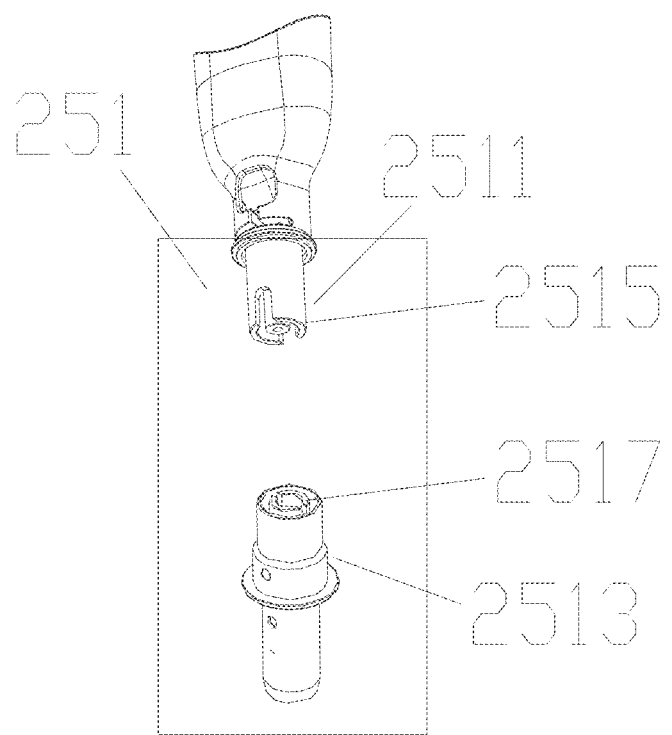
FIG. 7 is a schematic diagram of the rotatory fixed shaft of the present invention.

More specifically, as shown in FIG. 7, the rotary fixed shaft 251 further comprises a first rotary fixed shaft 2511 and a second rotary fixed shaft 2513, wherein the first rotary fixed shaft 2511 extends from the reception cavity 100 shell 1007 at an angle (ranging from 0° (included) and 180° (included) and has a first limiting end for the rotary groove, and the first rotary fixed shaft 2511 has a first limiting post 2515.

More specifically, the second rotary fixed shaft 2513 has a first connecting portion 2001 connected to the extension, a second limiting end for the rotary shell and an extension fixing hole, and the second rotary fixed shaft 2513 has a second limiting post 2517 which is open and hollow at the other end corresponding to the first connecting portion 2001; the first limiting post 2515 can be embedded in or coupled inside the second limiting post 2517; a third mounting hole is provided on the first limiting post 2515; and a screw passes through the second limiting post 2517 and is screwed and fixed in the third mounting hole.

Specifically, one end of the extension 300 has a grip 310 at the second connecting portion 2003 away from the reception cavity 100.

Specifically, the grip 310 has a male-female anti-slip structure made of resilient materials, including EVA or silicone.

Specifically, the extension 300 further comprises a telescopic structure for adjusting the length of the extension 300.

Specifically, the telescopic structure comprises:

An outer extension 300, which is designed for limiting the shortest length of the extension 300 and provided with a grip 310; the outer extension 300 has a through-hole structure, the first end of the outer extension 300 has a threading structure, the size of the through-hole corresponding to the outlet of the first end of the outer extension 300 is smaller than outer diameter of the first end of the inner extension 300, and the size of the through-hole of the outer extension 300 is larger than the outer diameter of the first end of the inner extension 300, except for the outlet of the first end of the outer extension 300;

A locking elastic member for locking the movement of the inner extension 300, comprising at least one of a slotted deformation structural member and an elastic material;

A locking rotary member 250, which is designed for adjusting the deformation of the locking elastic member, and provided with a through-hole structure and with an internal threading, and the size of a first end opening of the locking rotary member 250 is greater than a second end opening 1001 corresponding to the first end opening 1001 of the locking rotary member 250;

The inner extension 300 is sleeved inside the outer extension 300, a first end portion of the non-inner extension of the inner extension 300 can pass through a first end outlet of the outer extension 300, a locking elastic member is mounted on the through-hole of the locking rotary member 250, the locking elastic member and locking rotary member 250 pass through the inner extension 300 which extends out of the first end outlet portion of the outer extension 300, and are rotatably connected to a threading structure of the outer extension 300, when the locking member is locked, the locking elastic member deforms to lock the movement of the inner extension 300, and when the locking member is released, the locking elastic member deforms slightly to release the inner extension 300, and the inner extension can move telescopically.

Figure 4:
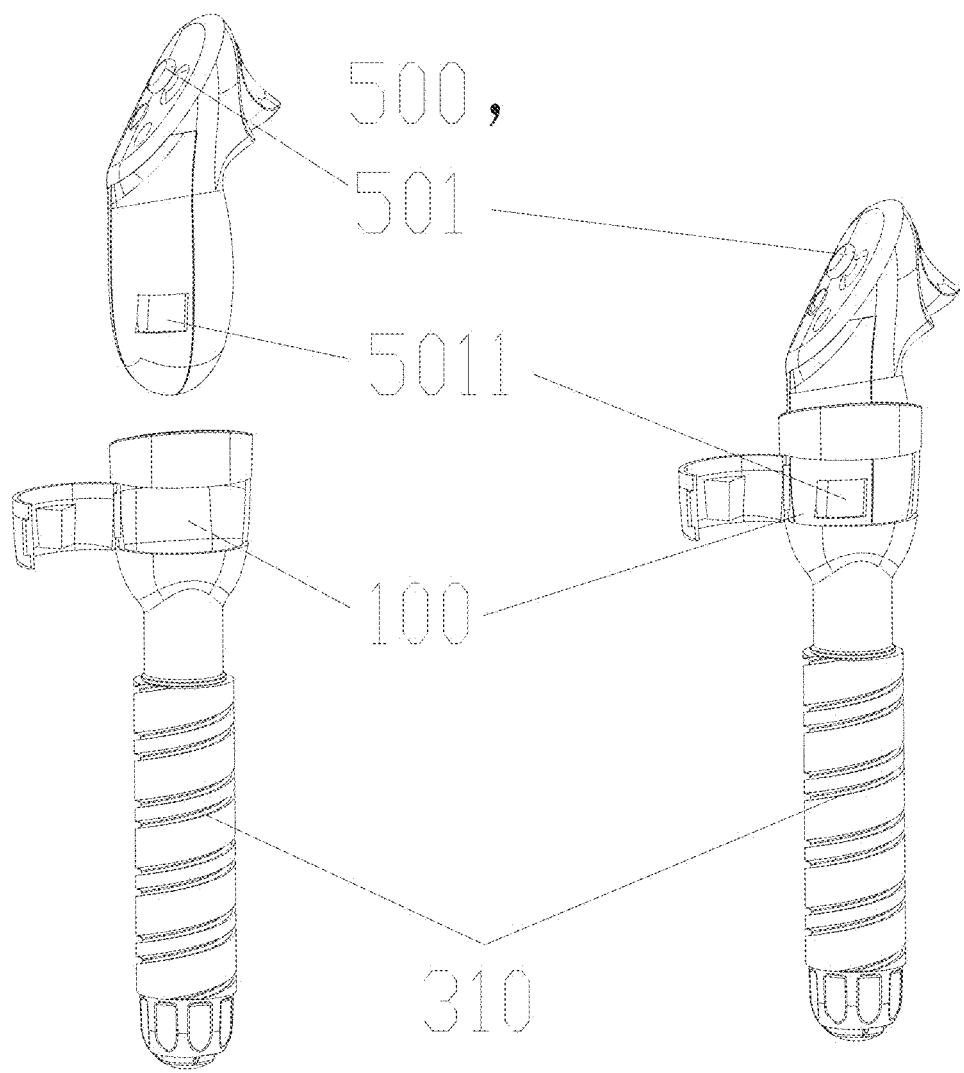
FIG. 4 is a schematic diagram of the present invention when a buckle is used as a fastener.

The application scenarios of the embodiments of the present invention are as follows:

When the buckle is used as a fastener, as shown in FIG. 4, the buckle 501 has a raised member 5011 that snaps into the hole 1005 to provide the joystick with a pushing force along the cavity bottom 1003 so as to limit longitudinal movement of the joystick along the reception cavity 100.

Specifically, the buckle 501 is mounted on the joystick at a distance from the opening in the longitudinal direction of the reception cavity 100, and the raised member 5011 of the buckle snaps into the hole 1005 to provide the joystick with a pushing force along the cavity bottom 1003 so as to limit the longitudinal movement of the joystick along the reception cavity 100.

Specifically, the buckle 501 has a rotary shaft, the rotary shaft is mounted on the reception cavity 100 shell, and the buckle 501 can rotate along the direction of rotation of the rotary shaft.

Figure 5:
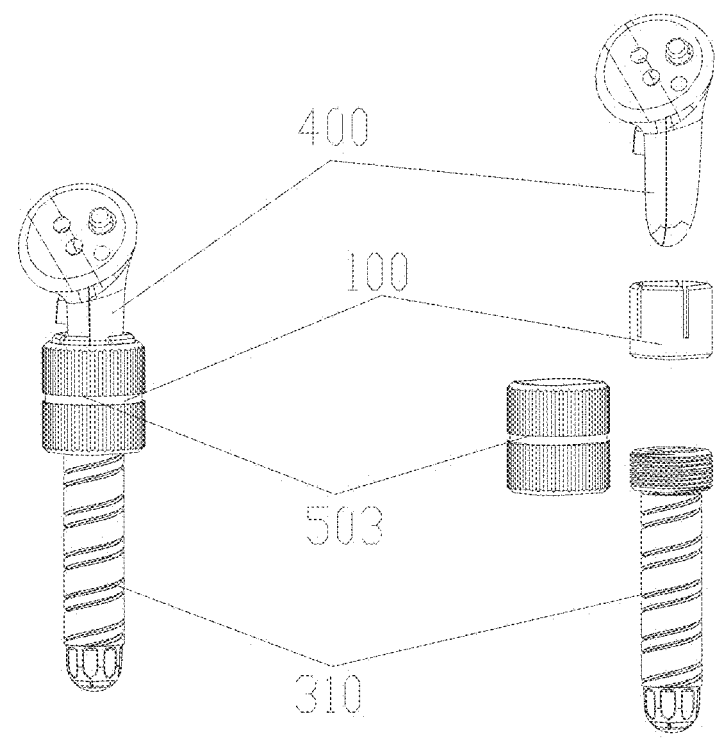
FIG. 5 is a schematic diagram of the present invention when a nut is used as a fastener.

When a nut is used as a fastener in the embodiments of the present invention, as shown in FIG. 5, a nut 503 is mounted on the reception cavity 100 shell 1007, and by means of rotating the nut 503, the reception volume of the reception cavity 100 may be changed to limit the movement of the joystick in the reception cavity 100.

Figure 6:
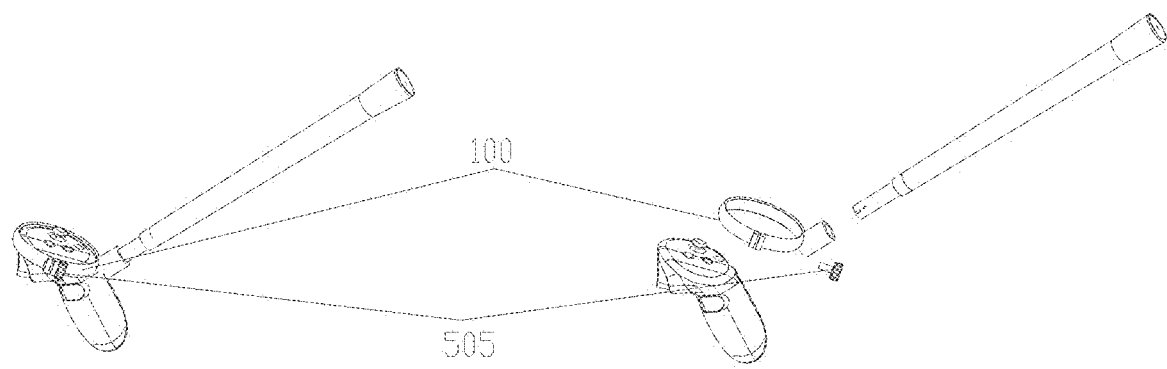
FIG. 6 is a schematic diagram of the present invention when a screw is used as a fastener.

When a screw is used as a fastener in the embodiment of the present invention, as shown in FIG. 6, the screw 505 passes through the hole 1005, and by means of rotating the screw 505, the reception volume of the reception cavity 100 may be changed to limit the movement of the joystick in the reception cavity 100.

In order to reduce the effect of poor signal transmission when the joystick application assembly 400 receives a signal, the reception cavity 100 is designed as a transparent reception cavity 100. The material of the reception cavity 100 is preferably PC. The penetration rate of the signal through the transparent reception cavity 100 is higher than that through the non-transparent one.

The embodiments of the present invention have been described in detail above with reference to the accompanying drawings, but the present invention is not limited to the described embodiments. It will be apparent to those skilled in the art that various changes, modifications, substitutions and variations can be made in these embodiments without departing from the principles and spirit of the present invention and yet fall within the scope of the present invention.

What is claimed is:

1. A joystick fastening device, comprising the components:

a reception cavity whose one end has an opening for receiving a joystick; the other end of the reception cavity away from the opening in a longitudinal direction of the opening is a cavity bottom whose size is less than or equal to that of the opening; the reception cavity further comprises a hole, and the hole is arranged at a position outside the opening;

a connection, which extends from a reception cavity shell at a pre-set angle to a central axis of the reception cavity, and one end of the connection opposite to the reception cavity shell has a first connecting portion;

an extension, which has a second connecting portion matched with the first connecting portion of the connection, and is connected to the first connecting portion via the second connecting portion so as to realize spatial movement of the joystick via the extension;

wherein one end of the extension has a grip at the second connecting portion away from the reception cavity;

wherein the connection further comprise a rotary member arranged between the first connecting portion and the reception cavity for fastening or tightening the strap.

2. The joystick fastening device according to claim 1, wherein the preset angle ranges from 0° (included) to 180° (included); the joystick also comprises a fastener designed for fixing the joystick and comprising at least one of a strap, a buckle, a screw, or a nut; the faster is designed to lock the joystick to limit movement of the joystick in the reception cavity.

3. The joystick fastening device according to claim 2, wherein the strap has a first end and a second end arranged outside the first end, wherein the first end of the strap is fixedly connected to the joystick, and the second end passes through the hole or is fixed on the connection or the reception cavity shell; the strap may be tightened to provide the joystick with a pulling force along the bottom of the reception cavity as the second end passes through the hole.

4. The joystick fastening device according to claim 2, wherein the buckle has a raised member which snaps into the hole to provide the joystick with a pushing force along the cavity bottom so as to limit the longitudinal movement of the joystick along the reception cavity.

5. The joystick fastening device according to claim 4, wherein the buckle is mounted on the joystick at a distance from the opening in the longitudinal direction of the reception cavity, and the raised member of the buckle snaps into the hole to provide the joystick with a pushing force along the cavity bottom so as to limit the longitudinal movement of the joystick along the reception cavity.

6. The joystick fastening device according to claim 4, wherein the buckle has a rotary shaft, the rotary shaft is mounted on the reception cavity shell, and the buckle can rotate along the direction of rotation of the rotary shaft, and the raised member of the buckle snaps into the hole to provide the joystick with a pushing force so as to limit the longitudinal movement of the joystick along the reception cavity.

7. The joystick fastening device according to claim 2, wherein a screw passes through the hole, and by means of rotating the screw, the reception volume of the reception cavity may be changed to limit the movement of the joystick in the reception cavity.

8. The joystick fastening device according to claim 2, wherein a nut is mounted on the reception cavity shell, and by means of rotating the nut, the reception volume of the reception cavity may be changed to limit the movement of the joystick in the reception cavity.

9. The fastening device of joystick according to claim 1, wherein the joystick further comprises an elastic material, and the joystick is fixed at an inner wall of the reception cavity by the elastic material, and the friction between the joystick and the inner wall of the reception cavity is increased by the elastic material.

10. The fastening device of joystick according to claim 1, wherein the first connecting portion of the connection comprises at least one of a fixing hole, a threading, a slot, and a raised member, and the connection is designed to fixedly connect the extension; the second connecting portion of the extension comprises at least one of a fixing hole, a threading, a slot, and a raised member to fixedly connect the connection.

11. The fastening device of joystick according to claim 1, wherein the rotary member comprises a rotary shell and a rotary fixed shaft, wherein the rotary shell has a strap fixing part for fixing the strap, the inner wall of the rotary shell has a concave structure, the rotary fixed shaft has a convex structure corresponding to the concave structure of the rotary shell, the concave structure and the convex structure can be clamped and rotated to tighten the strap.

12. The fastening device of joystick according to claim 1, wherein the grip has a male-female anti-slip structure made of resilient material.

13. The fastening device of joystick according to claim 1, wherein the extension further comprises a telescopic structure for adjusting a length of the extension.

14. The fastening device of joystick according to claim 13, wherein the telescopic structure comprises:
   an outer extension, which is designed for limiting a shortest length of the extension and provided with a grip; the outer extension has a through-hole structure, a first end of the outer extension has a threading structure, a size of the through-hole corresponding to an outlet of the first end of the outer extension is smaller than an outer diameter of the first end of the inner extension, and the size of the through-hole of the outer extension is larger than the outer diameter of the first end of the inner extension, except for the outlet of the first end of the outer extension;
   a locking elastic member for locking a movement of the inner extension, comprising at least one of a slotted deformation structural member and an elastic material;
   a locking rotary member, which is designed for adjusting a deformation of the locking elastic member, and provided with a through-hole structure and with an internal threading, and a size of a first end opening of the locking rotary member is greater than a second end opening corresponding to the first end opening of the locking rotary member;
   an inner extension is sleeved inside the outer extension, a first end portion of the non-inner extension of the inner extension can pass through a first end outlet of the outer extension, a locking elastic member is mounted on the through-hole of the locking rotary member, the locking elastic member and locking rotary member pass through the inner extension which extends out of the first end outlet portion of the outer extension, and are rotatably connected to a threading structure of the outer extension, when the locking member is locked, the locking elastic member deforms to lock the movement of the inner extension, and when the locking member is released, the locking elastic member deforms slightly to release the inner extension, and the inner extension can move telescopically.

15. The fastening device of joystick according to claim 1, wherein: the reception cavity is transparent.

\* \* \* \* \*